(12) United States Patent
Xing et al.

(10) Patent No.: US 8,902,856 B2
(45) Date of Patent: Dec. 2, 2014

(54) ASSISTING RETURN TO A FIRST NETWORK FROM A SECOND NETWORK AFTER PERFORMANCE OF A CIRCUIT SWITCHED FALLBACK PROCEDURE

(71) Applicant: Apple Inc., Cupertino, CA (US)

(72) Inventors: Longda Xing, San Jose, CA (US);
Jianxiong Shi, Pleasanton, CA (US);
Wen Zhao, San Jose, CA (US)

(*) Notice: Subject to any disclaimer, the term of this patent is extended or adjusted under 35 U.S.C. 154(b) by 235 days.

(21) Appl. No.: 13/633,105

(22) Filed: Oct. 1, 2012

(65) Prior Publication Data

US 2014/0018079 A1 Jan. 16, 2014

Related U.S. Application Data

(60) Provisional application No. 61/671,659, filed on Jul. 13, 2012.

(51) Int. Cl.
*H04W 4/00* (2009.01)

(52) U.S. Cl.
USPC ........ 370/331; 370/352; 370/355; 455/435.2; 455/436; 455/437

(58) Field of Classification Search
CPC . H04W 36/0022; H04W 48/18; H04W 36/14; H04W 36/0027
USPC ........................ 455/432.1–432.3, 435.1–444; 370/331–332, 352–356
See application file for complete search history.

(56) References Cited

U.S. PATENT DOCUMENTS

| | | | |
|---|---|---|---|
| 8,254,981 B2* | 8/2012 | Dwyer et al. ................ 455/525 |
| 8,526,949 B2* | 9/2013 | Dwyer et al. ............. 455/435.2 |
| 8,559,387 B2* | 10/2013 | Dwyer et al. ................ 370/331 |
| 2010/0113010 A1 | 5/2010 | Tenny et al. |
| 2010/0278142 A1* | 11/2010 | Dwyer et al. ................ 370/331 |
| 2011/0222509 A1 | 9/2011 | Lee |
| 2011/0274045 A1* | 11/2011 | Wu ............................... 370/328 |
| 2012/0069817 A1* | 3/2012 | Ling et al. .................... 370/331 |
| 2012/0182912 A1* | 7/2012 | Watfa et al. ................... 370/311 |
| 2012/0214483 A1 | 8/2012 | Tong et al. |

(Continued)

FOREIGN PATENT DOCUMENTS

WO WO 2010/080802 A1 7/2010

OTHER PUBLICATIONS

3GPP TS 23.272 v11.2.0 (Sep. 2012).

*Primary Examiner* — Allahyar Kasraian
(74) *Attorney, Agent, or Firm* — Womble Carlyle Sandridge & Rice LLP

(57) ABSTRACT

A method for assisting a wireless communication device to return to a first network from a second network subsequent to termination of a voice call for which a Circuit Switched Fallback procedure was performed to transition from the first network to the second network for servicing of the voice call is provided. The method can include preventing transmission of a data flow for a data service after termination of the voice call. The method can further include searching for the first network while transmission of the data flow is prevented. If the first network is found, the method can additionally include reverting to the first network and servicing the data service on the first network. If the first network is not found, the method can also include remaining on the second network and servicing the data service on the second network.

25 Claims, 6 Drawing Sheets

(56) References Cited

U.S. PATENT DOCUMENTS

| | | |
|---|---|---|
| 2012/0258707 A1* | 10/2012 | Mathias et al. ............ 455/426.1 |
| 2013/0034080 A1* | 2/2013 | Yang et al. .................... 370/331 |
| 2013/0094446 A1* | 4/2013 | Swaminathan ............... 370/328 |
| 2013/0107863 A1* | 5/2013 | Faccin et al. ................. 370/331 |
| 2013/0328996 A1* | 12/2013 | RAWAT et al. ............ 348/14.02 |
| 2013/0331054 A1* | 12/2013 | Kodali ....................... 455/404.1 |
| 2014/0003389 A1* | 1/2014 | Wang et al. ................... 370/331 |
| 2014/0016614 A1* | 1/2014 | Velev et al. ................... 370/331 |
| 2014/0146784 A1* | 5/2014 | Swaminathan et al. ...... 370/331 |

* cited by examiner

ASSISTING RETURN TO A FIRST NETWORK FROM A SECOND NETWORK AFTER PERFORMANCE OF A CIRCUIT SWITCHED FALLBACK PROCEDURE

CROSS-REFERENCE TO RELATED APPLICATIONS

This application claims priority to U.S. Provisional Patent Application No. 61/671,659, filed on Jul. 13, 2012, which is incorporated herein in its entirety by reference.

FIELD OF THE DESCRIBED EMBODIMENTS

The described embodiments relate generally to wireless communications and more particularly to assisting return to a first network from a second network after performance of a circuit switched fallback (CSFB) procedure.

BACKGROUND

Cellular networks using newer radio access technology (RAT) systems, such as Long Term Evolution (LTE) systems, are being developed and deployed. Networks using these newer RATs often support faster data rates than networks utilizing legacy RATs, such as second generation (2G) and third generation (3G) RATs, including Universal Mobile Telecommunications System (UMTS) networks and Global System for Mobile Communications (GSM) networks. However, in some deployments, LTE and other new RATs may not fully support some services that can be handled by legacy networks. Accordingly, LTE networks are often co-deployed in overlapping regions with legacy networks and wireless communication devices may transition between RATs as services or coverage may require. For example, in some deployments, LTE networks are not capable of supporting voice calls. Accordingly, when a wireless communication device receives or initiates a voice call while connected to a network that supports data sessions, but not voice calls, the wireless communication device can perform a circuit switched fallback (CSFB) procedure to transition to a legacy network that supports voice calls.

In some instances, there may be a significant amount of background data traffic on a wireless communication device, including, for example, email, a data service for keeping a device connected to servers, and/or the like. Since newer networks such as LTE offer faster data rates than legacy networks, devices enabled to operate on LTE networks generally prefer to stay on LTE when LTE access is available for both idle state and active data transmission state. In this regard, LTE can offer a better user experience than legacy networks due to its higher data rates. Under the CSFB scheme, LTE will only provide the data service, while legacy networks will provide both voice and data service. Due to the nature of smart phones and other wireless communication devices, a data call can be serviced at the same time with the voice call on a legacy network. However, even after the voice call has terminated, a wireless communication device can sometimes be inhibited from returning to LTE due to underlining data call activities, as a device can need idle time to do system re-selection in order for it to return to LTE. As such, even though wireless communication devices generally prefer to operate on LTE networks when available unless servicing an active voice call in order to provide better user experience, a device can often be stuck on a legacy network even after termination of a voice call if there is an active data transfer. In many instances, devices can remain stuck on a legacy network for as long as 30 minutes following a voice call due to ongoing data traffic preventing reselection to LTE. As such, users can experience less than desirable data performance for significant time periods following voice call termination even when access to a network offering faster data rates is available.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present specification are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some embodiments disclosed herein provide for assisting return to a first network from a second network after performance of a CSFB procedure. In this regard, a wireless communication device in accordance with some example embodiments can be configured to prevent transmission of a data flow for a data service after termination of a voice call in order to provide idle time to enable searching for the first network. If the first network is found, the wireless communication device of such embodiments can return to the first network and service the data service on the first network, thus offering a better user experience. If, however, the first network is not found after a certain period of time, the wireless communication device of such embodiments can remain on the second network and resume servicing the data service on the second network. Accordingly, such example embodiments enable a faster return to a network following performance of a CSFB procedure, thus offering a better user experience for data services due to a quicker return to a network offering faster data rates.

Figure 1:
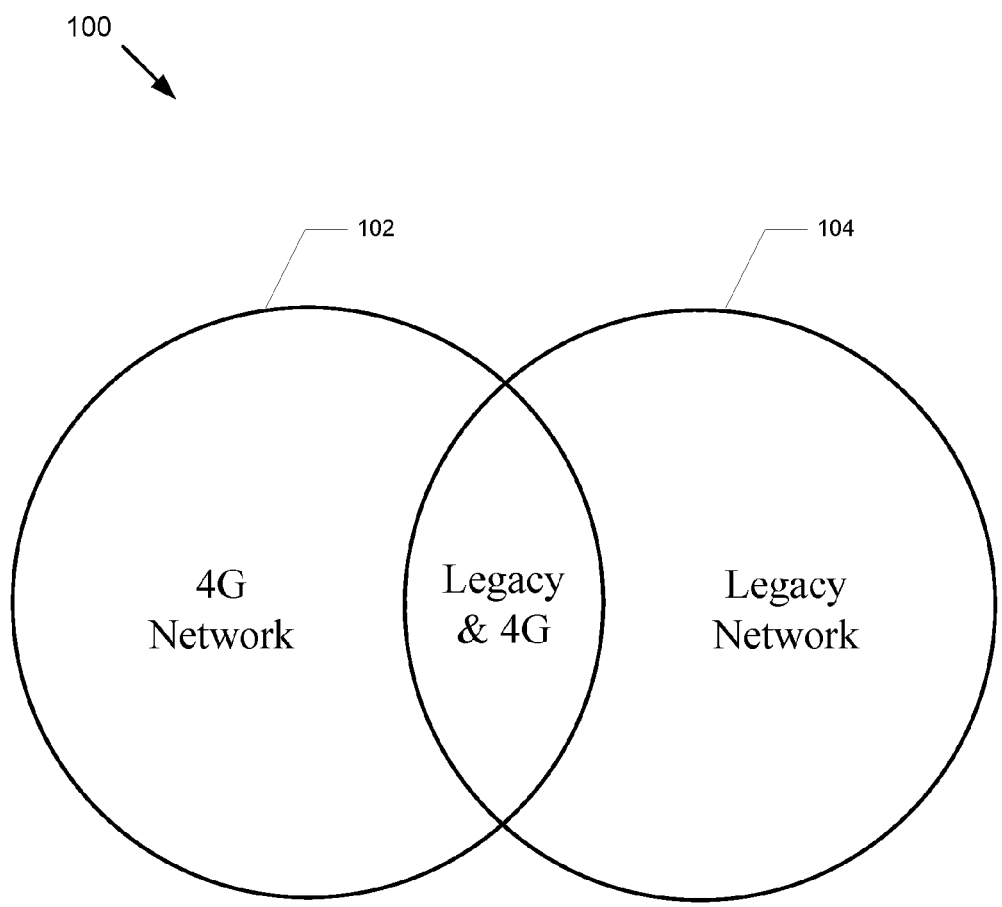
FIG. 1 illustrates overlapping coverage of a fourth generation network and a legacy network in accordance with some example embodiments.

FIG. 1 illustrates overlapping coverage of a fourth generation (4G) network 102 and a legacy network 104 in a communications system 100 in accordance with some example embodiments. The 4G network 102 can, for example, be a network based on an LTE standard, such as an LTE network or an LTE-Advanced (LTE-A) network, or other network that can offer faster data rates than legacy networks, such as 2G and 3G networks, but may not support voice calls. It will be appreciated that the 4G network is illustrated by way of example, and not by way of limitation. In this regard, other networks in existence now or that may be developed in the future that offer higher data rates but that do not support CS voice calls can be substituted for the 4G network 102 within the scope of the disclosure. The legacy network 104 can be any legacy network having a CS domain to support CS voice calls. By way of non-limiting example, the legacy network 104 can be a 3G network, such as a Wideband Code Division Multiple Access (WCDMA) or other Universal Mobile Telecommunications System (UMTS) network, such as a Time Division Synchronous Code Division Multiple Access (TD-SCDMA) network. As a further example, the legacy network 104 can be a CDMA2000 network, such as a 1xRTT network, or other network standardized by the Third Generation Partnership Project 2 (3GPP2) that supports a CS domain. As another example, the legacy network can be a 2G network such as a Global System for Mobile Communications (GSM) network.

The 4G network 102 and legacy network 104 can each have regions of coverage represented by the respective circles illustrated in FIG. 1. The regions of coverage can overlap, such as illustrated by the overlapping portions of the circles in FIG. 1. A wireless communication device in accordance with some example embodiments can operate on both the 4G network 102 and the legacy network 104. Thus, for example, when the wireless communication device is in a region of overlapping coverage, the wireless communication device can be connected to the 4G network 102 with an ongoing data session and can perform a CSFB procedure to the legacy network 104 in response to initiation of a voice call.

Figure 2:
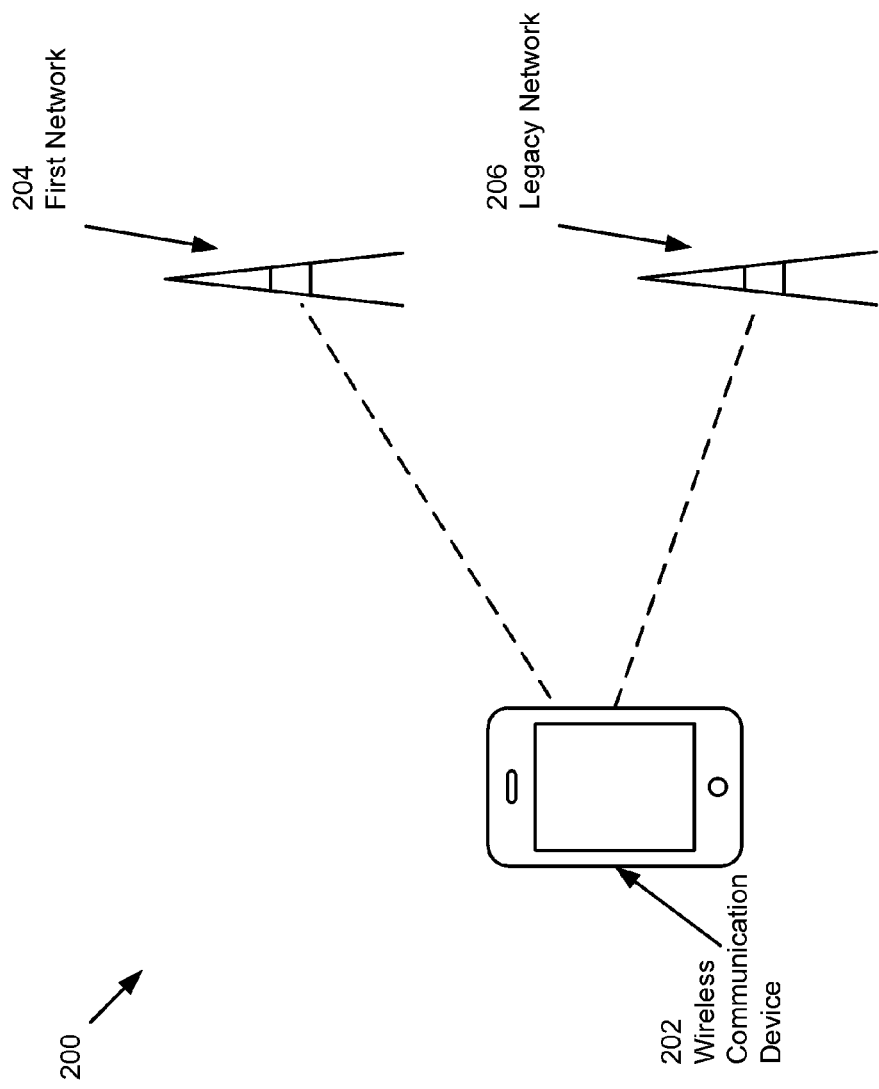
FIG. 2 illustrates an example system having multiple wireless communication networks to which a wireless communication device can connect in accordance with some example embodiments.

FIG. 2 illustrates an example system 200 having multiple wireless communication networks to which a wireless communication device 202 can connect in accordance with some example embodiments. By way of non-limiting example, the wireless communication device 202 can be a cellular phone, such as a smart phone device; a tablet computing device; a laptop computing device; or other computing device configured to operate within both a first network 204 and a legacy network 206. The first network 204 can be any network supporting packet switched (PS) data sessions and offering higher theoretical data rates than the legacy network 206, but that does not support CS voice calls. Thus, for example, the first network 204 can be a network using an LTE standard (e.g., an LTE network, LTE-A network, or using another present or future developed LTE standard) or other 4G network, such as the 4G network 102 illustrated in FIG. 1. The legacy network 206 can be any network having a CS domain to support CS voice calls. By way of non-limiting example, the legacy network 206 can be a UMTS network, a 3GPP2 network, or other 3G network. As a further example, the legacy network 206 can be a GSM or other 2G network, or other legacy network that can support CS voice calls. In this regard, the legacy network 206 can be the legacy network 104.

As illustrated in FIG. 2, the wireless communication device 202 can be within signaling range of both a base station or other access point for the first network 204 and a base station or other access point for the legacy network 206. In this regard, the wireless communication device 202 can be located in a region of overlapping coverage of the first network 204 and the legacy network 206. As such, the wireless communication device 202 can connect to the first network 204. In response to initiation of a CS voice call (e.g., a mobile originating voice call initiated by the wireless communication device 202 or a mobile terminating voice call placed to the wireless communication device 202), the wireless communication device 202 can participate in a CSFB procedure to the legacy network 206 so that the voice call can be supported. The CSFB procedure can, for example, be performed as defined in TS 23.272, the contents of which are disclosed herein by reference in its entirety. In some instances, the wireless communication device 202 can establish a data session over the first network 204 prior to performance of the CSFB procedure, and the data session can be moved to the legacy network 206 as a result of the CSFB procedures. Additionally or alternatively, in some instances, a data session can be established over the legacy network 206 subsequent to performance of the CSFB procedure. As the legacy network 206 can offer lower data rates than the first network 204, a data session moved to or established on the legacy network 206 as a result of a CSFB procedure can be impacted by lower data rates than would be supported if the data session were serviced by the first network 204.

Figure 3:
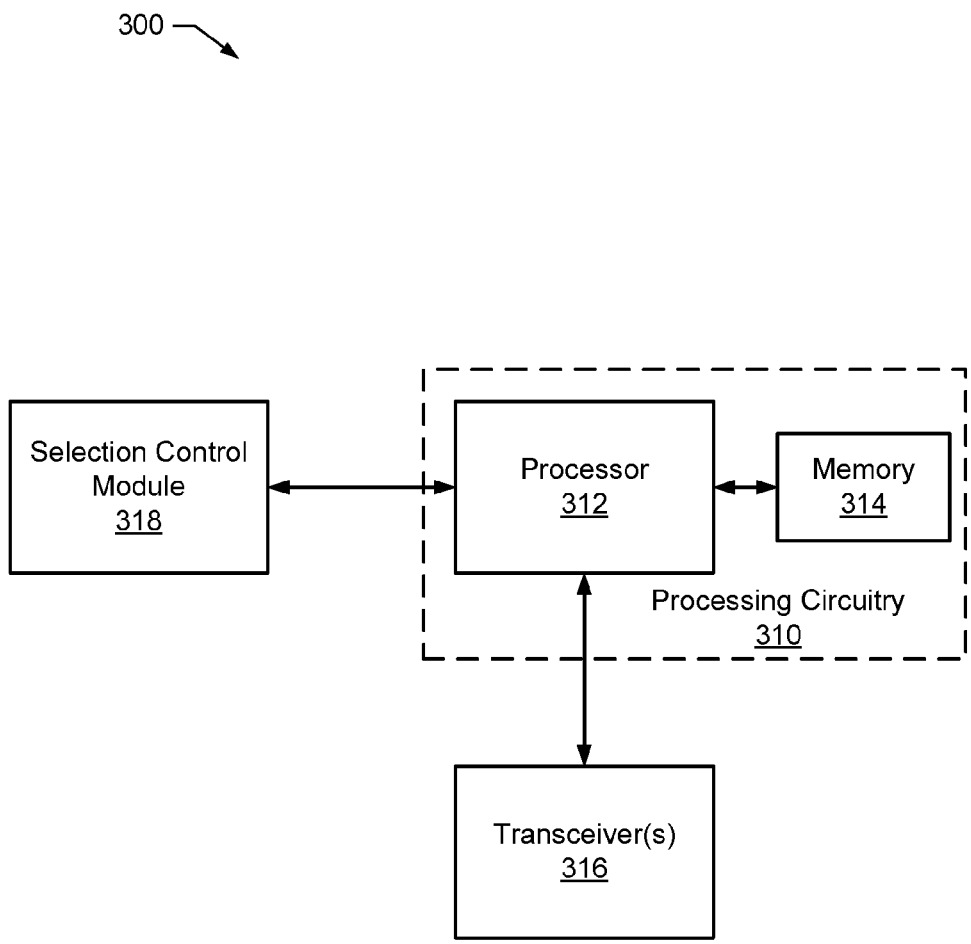
FIG. 3 illustrates a block diagram of an apparatus that can be implemented on a wireless communication device in accordance with some example embodiments.

FIG. 3 illustrates a block diagram of an apparatus 300 that can be implemented on a wireless communication device 202 in accordance with some example embodiments. In this regard, when implemented on a computing device, such as wireless communication device 202, apparatus 300 can enable the computing device to operate within the system 200 in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the apparatus 300 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a single chip or chipset. In some example embodiments in which one or more components of the apparatus 300 are embodied as a chipset, the chipset can be capable of enabling a computing device to operate in the system 200 when implemented on or otherwise operably coupled to the computing device. Thus, for example, one or more components of the apparatus 300 can provide a chipset configured to enable a computing device to operate over the first network 204 and/or the legacy network 206.

In some example embodiments, the processing circuitry 310 can include a processor 312 and, in some embodiments, such as that illustrated in FIG. 3, can further include memory 314. The processing circuitry 310 can be in communication with or otherwise control a transceiver(s) 316 and/or selection control module 318.

The processor 312 can be embodied in a variety of forms. For example, the processor 312 can be embodied as various processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the apparatus 300 as described herein. In some example embodiments, the processor 312 can be configured to execute instructions that can be stored in the memory 314 or that can be otherwise accessible to the processor 312. As such, whether configured by hardware or by a combination of hardware and software, the processor 312 can be capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, transceiver(s) 316, or selection control module 318 via a bus(es) for passing information among components of the apparatus 300.

The apparatus 300 can further include transceiver(s) 316. The transceiver(s) 316 can enable the apparatus 300 to send wireless signals to and receive signals from one or more wireless networks, such as the first network 204 and the legacy network 206. As such, the transceiver(s) 316 can be configured to support any type of cellular or other wireless communication technology that may be implemented by the first network 204 and/or legacy network 206. In some example embodiments, the transceiver(s) 316 can include a single transceiver configured to enable the wireless communication device 202 to connect to both the first network 204 and the legacy network 206. Alternatively, in some example embodiments, the transceiver(s) 316 can include a first transceiver configured to enable the wireless communication device 202 to connect to the first network 204 and a second transceiver configured to enable the wireless communication device 202 to connect to the legacy network 206.

The apparatus 300 can further include selection control module 318. The selection control module 318 can be embodied as various means, such as circuitry, hardware, a computer program product comprising computer readable program instructions stored on a computer readable medium (for example, the memory 314) and executed by a processing device (for example, the processor 312), or some combination thereof. In some embodiments, the processor 312 (or the processing circuitry 310) can include, or otherwise control the selection control module 318.

The selection control module 318 can be configured in some example embodiments to determine that a voice call for which a CSFB procedure had been performed to transition the wireless communication device 202 from the first network 204 to the legacy network 206 has terminated. The selection control module 318 can be configured to prevent transmission of a data flow(s) for a data service(s) after termination of the voice call. Preventing transmission of a data flows can, for example, include pausing transmission of a data flows for an active data service. Additionally or alternatively, preventing transmission of a data flow can include blocking an inactive data service from activating so as to prevent transmission of a data flow by the data service.

A data service for which transmission of a data flow is prevented can be any data service that can be implemented on a wireless communication device 202. By way of non-limiting example, the data service(s) for which transmission of a data flow is prevented can include a data call, a data service for maintaining a connection, email data service, and/or the like. A prevented data flow can, for example, be a packet switched data flow.

The selection control module 318 can be further configured to search for the first network 204 while transmission of the data flow(s) is prevented. If the first network 204 is found, then the selection control module 318 can be configured to control the wireless communication device 202 to revert to the first network 204 and service the data service(s) on the first network 204. If, however, the first network 204 is not found, then the wireless communication device 202 can remain on the legacy network 206 at least temporarily and the data service(s) for which transmission of a data flow had been prevented can be serviced on the legacy network 206.

Preventing transmission of a data flow can provide an idle period that allows the wireless communication device 202 to search for and perform reselection to the first network 204 while transmission of the data flow(s) is prevented. In this regard, if a data flow is transmitted by the wireless communication device 202 of some example embodiments, the wireless communication device 202 can be unable to search for and return to the first network 204 until all pending data for transmission has been transmitted or there is otherwise a break in data transmission. As data transmission can be curbed during the voice call in some embodiments, such as to avoid having multiple simultaneously active radio access bearers (RABs) consuming power, and there can be accumulated data in a data flow awaiting transmission after termination of the voice call, providing the idle period by preventing transmission of a data flow can allow for a quicker return to the first network 204 so that data services can be serviced by the higher data rate of the first network 204.

In some example embodiments, prevention of transmission of a data flow can be temporary, such as for a predetermined period of time. As such, if the first network 204 is not found within the predetermined period of time, then the data service(s) can be serviced on the legacy network 206 and transmission of the data flow can again be allowed. Accordingly, indefinite prevention of transmission of a data flow can be avoided in instances in which access to the first network 204 is not available.

Figure 4:
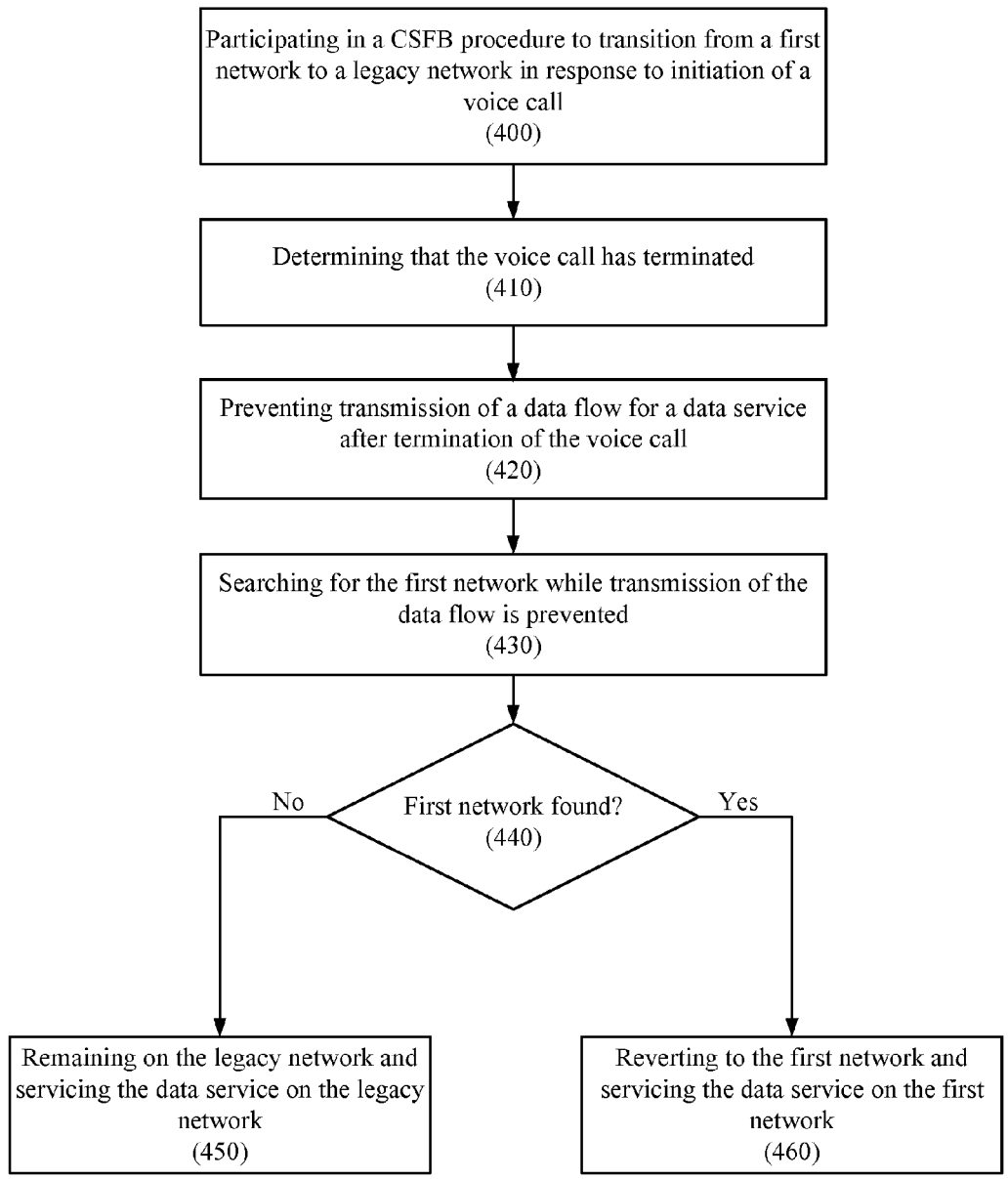
FIG. 4 illustrates a flowchart according to an example method for assisting return to a first network from a legacy network after performance of a CSFB procedure according to some example embodiments.

FIG. 4 illustrates a flowchart according to an example method for assisting return to a first network from a legacy network after performance of a CSFB procedure according to some example embodiments. Operation 400 can include the wireless communication device 202 participating in a CSFB procedure to transition from the first network 204 to the legacy network 206 in response to initiation of a voice call. The voice call can be a mobile initiated voice call, or can be a mobile terminating voice call. Operation 410 can include determining that the voice call has terminated. Operation 420 can include preventing transmission of a data flow for a data service after termination of the voice call. Operation 420 can be performed responsive to termination of the voice call. Operation 430 can include searching for the first network 204 while transmission of the data flow is prevented. One or more of processing circuitry 310, processor 312, memory 314, transceiver(s) 316, or selection control module 318 can, for example, provide means for performing operation 430. One or more of processing circuitry 310, processor 312, memory 314, transceiver(s) 316, or selection control module 318 can, for example, provide means for performing operations 400-430.

Operation 440 can include determining whether the first network 204 was found. One or more of processing circuitry 310, processor 312, memory 314, or selection control module 318 can, for example, provide means for performing operation 430. If the first network 204 was not found, then the method can proceed to operation 450, which can include remaining on the legacy network 206 and servicing the data service on the legacy network 206. In this regard, operation 450 can include resuming and/or otherwise allowing sending and/or receiving data in support of the data service on the legacy network 206. One or more of processing circuitry 310, processor 312, memory 314, transceiver(s) 316, or selection control module 318 can, for example, provide means for performing operation 450. If, however, it is determined at operation 440 that the first network 204 has been found, the method can proceed to operation 460, which can include the wireless communication device 202 reverting to the first network 204 and servicing the data service on the first network 204, such as by sending and/or receiving data in support of the data service on the first network 204. One or more of processing circuitry 310, processor 312, memory 314, transceiver(s) 316, or selection control module 318 can, for example, provide means for performing operation 460.

Figure 5:
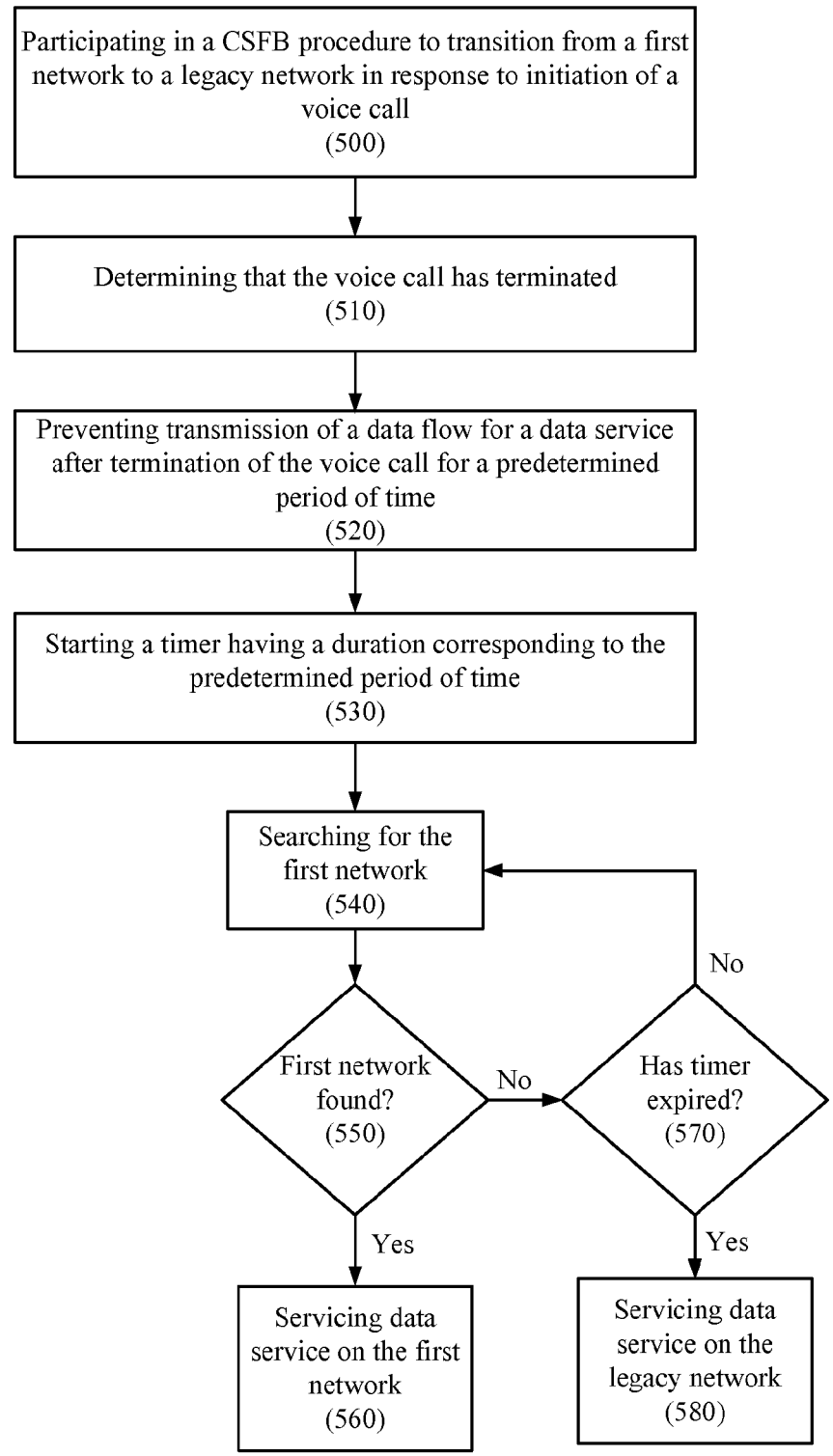
FIG. 5 illustrates a flowchart according to another example method for assisting return to a first network from a legacy network after performance of a CSFB procedure according to some example embodiments.

FIG. 5 illustrates a flowchart according to another example method for assisting return to a first network from a legacy network after performance of a CSFB procedure according to some example embodiments. Operation 500 can include the wireless communication device 202 participating in a CSFB procedure to transition from the first network 204 to the legacy network 206 in response to initiation of a voice call. The voice call can be a mobile initiated voice call, or can be a mobile terminating voice call. Operation 510 can include determining that the voice call has terminated. Operation 520 can include preventing transmission of a data flow for a data service after termination of the voice call for a predetermined period of time. Operation 520 can be performed responsive to termination of the voice call. One or more of processing circuitry 310, processor 312, memory 314, transceiver(s) 316, or selection control module 318 can, for example, provide means for performing operations 500-520 520. Operation 530 can include starting a timer having a duration corresponding to the predetermined period of time.

Operation 540 can include searching for the first network 204. One or more of processing circuitry 310, processor 312, memory 314, transceiver(s) 316, or selection control module 318 can, for example, provide means for performing operation 540. Operation 550 can include determining whether the first network 204 was found. One or more of processing circuitry 310, processor 312, memory 314, or selection control module 318 can, for example, provide means for performing operation 550. If it is determined at operation 550 that the first network 204 has been found, the method can proceed to operation 560, which can include the wireless communication device 202 reverting to the first network 204 and servicing the data service on the first network 204. In this regard, operation 560 can include sending and/or receiving data in support of the data service on the first network 204. One or more of processing circuitry 310, processor 312, memory 314, transceiver(s) 316, or selection control module 318 can, for example, provide means for performing operation 560.

If, however, it is determined at operation 550 that the first network 204 has not been found, the method can proceed to operation 570, which can include determining whether the timer started in operation 530 has expired. One or more of processing circuitry 310, processor 312, memory 314, or selection control module 318 can, for example, provide means for performing operation 570. If it is determined at operation 570 that the timer has not expired, the method can return to operation 540. In this regard, searching for the first network 204 can continue until expiry of the timer. If, however, it is determined at operation 570 that the timer has expired, the method can proceed to operation 580, which can include remaining on the legacy network 206 and servicing the data service on the legacy network 206. In this regard, operation 580 can include resuming and/or otherwise allowing sending and/or receiving data in support of the data service on the legacy network 206. One or more of processing circuitry 310, processor 312, memory 314, transceiver(s) 316, or selection control module 318 can, for example, provide means for performing operation 580.

Figure 6:
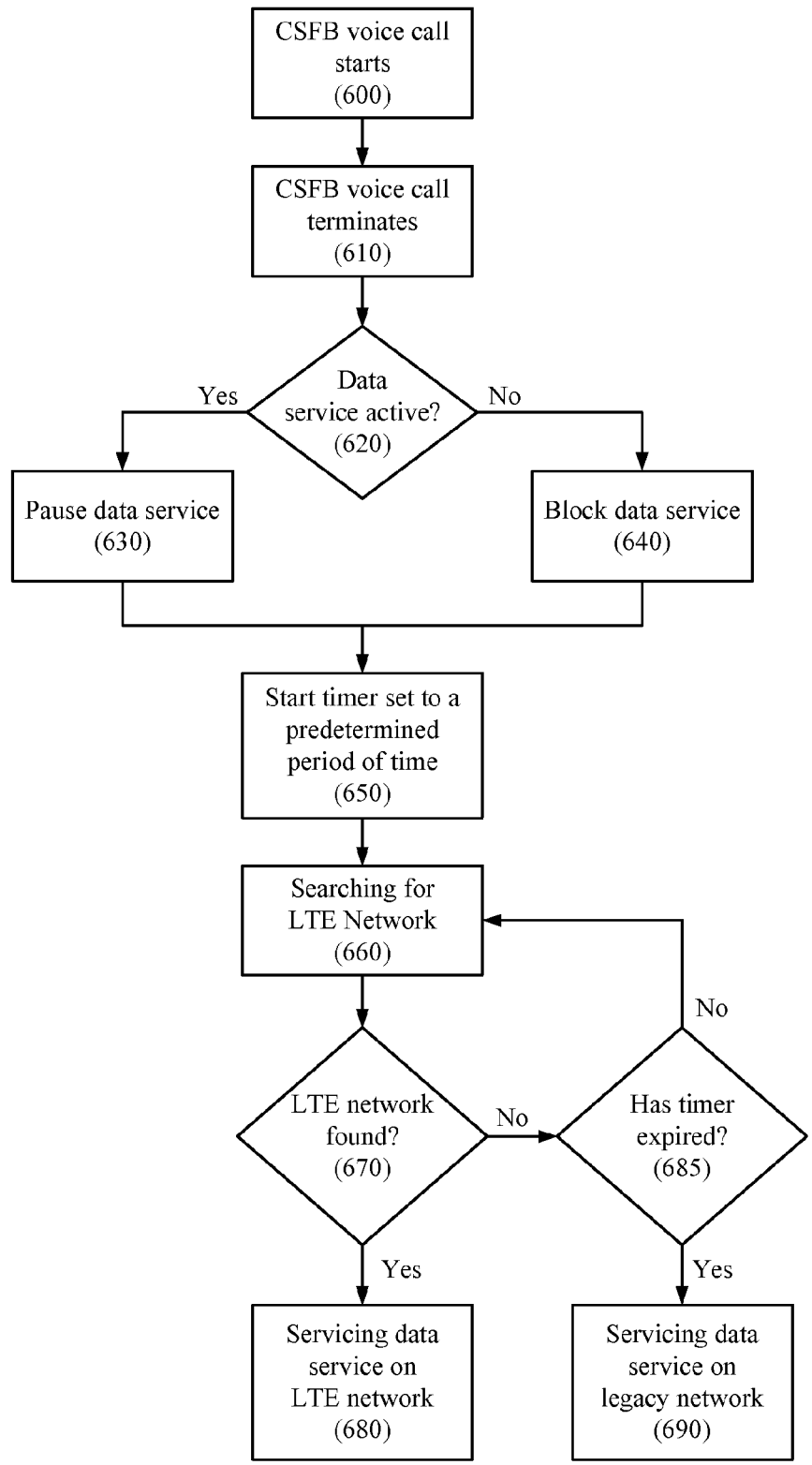
FIG. 6 illustrates a flowchart according to an example method for assisting return to an LTE network from a legacy network after performance of a CSFB procedure according to some example embodiments.

FIG. 6 illustrates a flowchart according to an example method for assisting return to an LTE network from a legacy network after performance of a CSFB procedure according to some example embodiments. In this regard, FIG. 6 illustrates a flow chart of embodiments that can assist a wireless communication device 202 to return to LTE after a CSFB voice call. This can be accomplished by pausing or blocking a data service(s) after the CSFB voice call has ended so that the device is given idle time to do system re-selection that will allow it to return to LTE, if an LTE network is available. If an LTE network is not available, then a timer will allow the smart phone device to continue data service in the legacy network after a period of unsuccessful search for an LTE network.

With reference to FIG. 6, operation 600 can include the CSFB voice call starting. In this regard, a CSFB procedure can be performed responsive to initiation of a mobile originated or mobile terminated voice call. The CSFB voice call can terminate at operation 610. Operation 620 can include determining whether a data service is active. If it is determined at operation 620 that the data service is active, the method can proceed to operation 630, which can include pausing the data service. If, however, it is determined at operation 620 that the data service is not active, the method can proceed to operation 640, which can include blocking the data service. One or more of operations 620-640 can be performed multiple times in some example embodiments to account for multiple data services. One or more of processing circuitry 310, processor 312, memory 314, transceiver(s) 316, or selection control module 318 can, for example, provide means for performing operations 620-640.

Operation 650 can include starting a timer that is set to a predetermined period of time. One or more of processing circuitry 310, processor 312, memory 314, or selection control module 318 can, for example, provide means for performing operation 650. Operation 660 can include searching for the LTE network. One or more of processing circuitry 310, processor 312, memory 314, transceiver(s) 316, or selection control module 318 can, for example, provide means for performing operation 660. Operation 670 can include determining whether the LTE network was found. One or more of processing circuitry 310, processor 312, memory 314, or selection control module 318 can, for example, provide means for performing operation 670. If it is determined at operation 670 that the LTE network has been found, the method can proceed to operation 680, which can include the wireless communication device 202 reverting to the LTE network and servicing the data service on the LTE network. In this regard, operation 680 can include sending and/or receiving data in support of the data service on the LTE network. One or more of processing circuitry 310, processor 312, memory 314, transceiver(s) 316, or selection control module 318 can, for example, provide means for performing operation 680.

If, however, it is determined at operation 670 that the LTE network has not been found, the method can proceed to operation 685, which can include determining whether the timer started in operation 650 has expired. One or more of processing circuitry 310, processor 312, memory 314, or selection control module 318 can, for example, provide means for performing operation 685. If it is determined at operation 685 that the timer has not expired, the method can return to operation 660. In this regard, searching for the LTE network can continue until expiry of the timer. If, however, it is determined at operation 685 that the timer has expired, the method can proceed to operation 690, which can include remaining on the legacy network 206 and servicing the data service on the legacy network 206. In this regard, operation 690 can include resuming and/or otherwise allowing sending and/or receiving data in support of the data service on the legacy network 206. One or more of processing circuitry 310, processor 312, memory 314, transceiver(s) 316, or selection control module 318 can, for example, provide means for performing operation 690.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for assisting a wireless communication device to return to a Long Term Evolution (LTE) network from a legacy network, the method comprising:
    participating in a Circuit Switched Fallback (CSFB) procedure to transition the wireless communication device from the LTE network to a legacy network for servicing of a voice call, wherein the legacy network has a circuit switched domain and the voice call is handled by the circuit switched domain of the legacy network;
    determining, by a processor, whether a data service is active on the wireless communication device after the voice call has terminated;
    pausing the data service for a predetermined period of time if it is determined that the data service is active;
    blocking the data service for the predetermined period of time if it is determined that the data service is not active;
    searching for the LTE network during the predetermined period of time for which the data service is paused or for which the data service is blocked;
    reverting to the LTE network and servicing the data service on the LTE network if the LTE network is found within the predetermined period of time; and
    servicing the data service on the legacy network if the LTE network is not found within the predetermined period of time.

2. The method of claim 1, further comprising:
    starting a timer having a duration corresponding to the predetermined period of time;
    determining if the LTE network is found prior to expiry of the timer; and
    reverting to the LTE network and servicing the data service on the LTE network if the LTE network is found prior to expiry of the timer,
    wherein servicing the data service on the legacy network if the LTE network is not found within the predetermined period of time comprises servicing the data service on the legacy network if the LTE network is not found prior to expiry of the timer.

3. The method of claim 1, wherein determining whether the data service is active is performed responsive to termination of the voice call.

4. The method of claim 1, wherein the data service comprises a packet switched data service.

5. The method of claim 1, wherein the legacy network is a Wideband Code Division Multiple Access (WCDMA) network.

6. The method of claim 1, wherein the legacy network is one of a Universal Mobile Telecommunications System (UMTS) network, a Global System for Mobile Communications (GSM) network, or a Third Generation Partnership Project 2 (3GPP2) network.

7. A method for assisting a wireless communication device to return to a first network from a second network subsequent to termination of a voice call for which a Circuit Switched Fallback (CSFB) procedure was performed to transition from the first network to the second network for servicing of the voice call, the method comprising:
- preventing, by a processor, transmission of a data flow for a data service after termination of the voice call;
- searching for the first network while transmission of the data flow is prevented;
- if the first network is found, reverting to the first network and servicing the data service on the first network; and
- if the first network is not found, remaining on the second network and servicing the data service on the second network.

8. The method of claim 7, wherein preventing transmission of the data flow comprises preventing transmission of the data flow for up to a predetermined period of time, and wherein if the first network is not found within the predetermined period of time, the method comprises remaining on the second network and servicing the data flow on the second network.

9. The method of claim 7, wherein preventing transmission of the data flow provides an idle period allowing searching for the first network to occur.

10. The method of claim 7, wherein preventing transmission of the data flow for the data service comprises:
- pausing transmission of the data flow in an instance in which the data service is active; and
- blocking the data service from activating in an instance in which the data service is not active.

11. The method of claim 7, further comprising curbing the data flow for the data service during the voice call, wherein the data flow includes accumulated data waiting for transmission after termination of the voice call as a result of curbing the data flow during the voice call.

12. The method of claim 7, wherein the second network has a circuit switched domain and the voice call is handled by the circuit switched domain of the second network.

13. The method of claim 7, wherein the data service comprises a data call.

14. The method of claim 7, wherein the first network comprises one of a Long Term Evolution (LTE) network or an LTE-Advanced (LTE-A) network, and wherein the second network comprises one of a Universal Mobile Telecommunications System (UMTS) network, a Global System for Mobile Communications (GSM) network, or a Third Generation Partnership Project 2 (3GPP2) network.

15. A wireless communication device comprising:
- at least one transceiver, the at least one transceiver configured to transmit data to and receive data from a first network and a second network; and
- processing circuitry coupled to the at least one transceiver, the processing circuitry configured to control the wireless communication device to at least:
  - participate in a circuit switched fallback (CSFB) procedure to transition from the first network to the second network in response to initiation of a voice call;
  - prevent transmission of a data flow for a data service after termination of the voice call;
  - search for the first network while transmission of the data flow is prevented;
  - if the first network is found, revert to the first network and service the data service on the first network; and
  - if the first network is not found, remain on the second network and service the data service on the second network.

16. The wireless communication device of claim 15, wherein the processing circuitry is configured to control the wireless communication device to prevent transmission of the data flow at least in part by preventing transmission of the data flow for up to a predetermined period of time, and wherein if the first network is not found within the predetermined period of time, the processing circuitry is configured to control the wireless communication device to remain on the second network and service the data flow on the second network.

17. The wireless communication device of claim 16, wherein the processing circuitry is configured to control the wireless communication device to search for the first network during an idle period resulting from preventing transmission of the data flow.

18. The wireless communication device of claim 15, wherein the processing circuitry is configured to control the wireless communication device to prevent transmission of the data flow for the data service at least in part by:
- pausing transmission of the data flow in an instance in which the data service is active; and
- blocking the data service from activating in an instance in which the data service is not active.

19. The wireless communication device of claim 15, wherein the data flow comprises a packet switched data flow.

20. The wireless communication device of claim 19, wherein the data service comprises a data call.

21. The wireless communication device of claim 15, wherein the first network comprises one of a Long Term Evolution (LTE) network or an LTE-Advanced (LTE-A) network, and wherein the second network comprises one of a Universal Mobile Telecommunications System (UMTS) network, a Global System for Mobile Communications (GSM) network, or a Third Generation Partnership Project 2 (3GPP2) network.

22. A computer program product for assisting a wireless communication device to return to a first network from a second network subsequent to termination of a voice call for which a Circuit Switched Fallback (CSFB) procedure was performed to transition from the first network to the second network for servicing of the voice call, the computer program product comprising at least one non-transitory computer readable storage medium having computer program code stored thereon, the computer program code comprising:
- program code for preventing transmission of a data flow for a data service after termination of the voice call;
- program code for searching for the first network while transmission of the data flow is prevented;
- program code for reverting to the first network and servicing the data service on the first network if the first network is found; and
- program code for remaining on the second network and servicing the data service on the second network if the first network is not found.

23. The computer program product of claim 22, wherein the program code for preventing transmission of the data flow comprises program code for preventing transmission of the data flow for up to a predetermined period of time, and wherein the program code for remaining on the second network and servicing the data service on the second network if the first network is not found comprises program code for remaining on the second network and servicing the data service on the second network if the first network is not found within the predetermined period of time.

24. The computer program product of claim 23, wherein the program code for preventing transmission of the data flow for the data service comprises:
- program code for pausing transmission of the data flow in an instance in which the data service is active; and
- program code for blocking the data service from activating in an instance in which the data service is not active.

25. The computer program product of claim 22, wherein the first network is a Long Term Evolution (LTE) network, and wherein the second network is a legacy network having a circuit switched domain for supporting circuit switched voice calls.

* * * * *